United States Patent
Dietz

[11] Patent Number: 5,181,481
[45] Date of Patent: Jan. 26, 1993

[54] FLUIDIZED BED COMBUSTION SYSTEM AND METHOD HAVING MULTIPLE FURNACE SECTIONS

[75] Inventor: David H. Dietz, Hampton, N.J.

[73] Assignee: Foster Wheeler Energy Corporation, Clinton, N.J.

[21] Appl. No.: 673,919

[22] Filed: Mar. 25, 1991

[51] Int. Cl.⁵ ............................. F23D 1/00; F23G 5/00
[52] U.S. Cl. ..................................... 122/4 D; 110/245
[58] Field of Search .................. 110/245, 234; 432/58, 432/15; 122/4 D

[56] References Cited

U.S. PATENT DOCUMENTS

| | | |
|---|---|---|
| 3,893,426 | 7/1975 | Bryers ................. 122/4 D |
| 4,111,158 | 9/1978 | Reh et al. . |
| 4,165,717 | 8/1979 | Reh et al. . |
| 4,338,283 | 7/1982 | Sakamoto et al. . |
| 4,469,050 | 9/1984 | Korenberg . |
| 4,548,138 | 10/1985 | Korenberg . |
| 4,594,967 | 6/1986 | Wolowodiuk . |
| 4,617,877 | 10/1986 | Gamble . |
| 4,665,864 | 5/1987 | Seshamani et al. . |
| 4,682,567 | 6/1987 | Garcia-Mallol et al. . |
| 4,694,758 | 9/1987 | Gorzegno et al. . |
| 4,709,662 | 12/1987 | Rawdon . |
| 4,716,856 | 1/1988 | Beisswenger et al. . |
| 4,761,131 | 8/1988 | Abdulally . |
| 4,813,479 | 3/1989 | Wahlgren . |
| 4,854,249 | 8/1989 | Khinkis et al. . |
| 4,856,460 | 8/1989 | Wied et al. . |
| 4,860,693 | 8/1989 | Jarvstrat . |
| 4,896,717 | 1/1990 | Campbell, Jr. et al. . |
| 4,947,804 | 8/1990 | Abdulally . |
| 4,969,930 | 11/1990 | Arpalahti . |
| 5,005,528 | 4/1991 | Virr ..................... 110/245 |

Primary Examiner—Henry C. Yuen
Attorney, Agent, or Firm—Marvin A. Naigur

[57] ABSTRACT

A combustion system in which a furnace having a fluidized bed disposed therein is divided into multiple sections by one or more partitions. Openings are provided in the lower portion of each partition for permitting the fluidized bed material to flow between the furnace sections, and openings are provided in the upper portion of each partition for equalizing the gas pressure between the furnace sections.

24 Claims, 3 Drawing Sheets

FLUIDIZED BED COMBUSTION SYSTEM AND METHOD HAVING MULTIPLE FURNACE SECTIONS

BACKGROUND OF THE INVENTION

This invention relates to a combustion system and method, and, mo re particularly, to such a system and method in which a plurality of adjacent furnace sections are provided for receiving fluidized beds.

Fluidized bed combustion systems are well known and include a furnace section in which air is passed through a bed of particulate material, including a fossil fuel, such as coal, and a sorbent for the oxides of sulfur generated as a result of combustion of the coal, to fluidize the bed and to promote the combustion of the fuel at a relatively low temperature. These types of combustion systems are often used in steam generators in which water is passed in a heat exchange relationship to the fluidized bed to generate steam and permit high combustion efficiency an fuel flexibility, high sulfur adsorption and low nitrogen oxides emissions.

The most typical fluidized bed utilized in the furnace section of these type systems is commonly referred to as a "bubbling" fluidized bed in which the bed of particulate material has a relatively high density and a well-defined, or discrete, upper surface. Other types of systems utilize a "circulating" fluidized bed in which the fluidized bed density is below that of a typical bubbling fluidized bed, the fluidizing air velocity is equal to or greater than that of a bubbling bed, and the flue gases passing through the bed entrain a substantial amount of the fine particulate solids to the extent that they are substantially saturated therewith.

Circulating fluidized beds are characterized by relatively high internal and external solids recycling which makes them insensitive to fuel heat release patterns, thus minimizing temperature variations and, therefore, stabilizing the sulfur emissions at a low level. The external solids recycling is achieved by disposing a cyclone separator at the furnace section outlet to receive the flue gases, and the solids entrained thereby, from the fluidized bed. The solids are separated from the flue gases in the separator and the flue gases are passed to a heat recovery area while the solids are recycled back to the furnace. This recycling improves the efficiency of the separator, and the resulting increase in the efficient use of sulfur adsorbent and fuel residence time reduces the adsorbent and fuel consumption.

U.S. Pat. No. 4,609,623 and U.S. Pat. No. 4,809,625, assigned to the same assignee as the present application, disclose a fluidized bed reactor in which a dense, or bubbling, bed is maintained in the lower portion of the furnace, while the bed is otherwise operated as a circulating bed. This hybrid arrangement results in several advantages not the least significant of which is the ability to utilize fuel and adsorbent over a relatively large particle size range.

In designing a fluidized bed combustion system of the above types, increases in furnace capacity from a given design are usually done by increasing the height of the furnace walls. However, this is expensive and there are certain limits to the height of the walls. It has therefore been suggested that the size of the furnace, and therefore its capacity, be increased by increasing the size of the furnace in "plan view" i.e., increasing the width and/or the depth of the furnace. However, this usually requires a common wall, or the like, to be placed in the furnace section to divide the area into two or more fluidized beds which requires separate operating controls, etc. which is expensive. Also, the common wall is subjected to lateral loading, especially when the multiple beds operate differently or if one bed is rendered inoperable due to equipment failure. This lateral loading can cause damage to the wall and attendant reduction in operation and efficiency.

SUMMARY OF THE INVENTION

It is therefore an object of the present invention to provide a fluidized bed combustion system and method which has an increased capacity without any increase in furnace wall height.

It is a further object of the present invention to provide a fluidized bed combustion system and method of the above type in which the furnace is divided into two or more separate furnace sections.

It is a further object of the present invention to provide a fluidized bed combustion system and method of the above type in which a common wall is provided in the furnace to divide it into two separate sections.

It is a still further object of the present invention to provide a fluidized bed combustion system and method of the above type in which the common wall is vented to equalize the gas pressure across the wall and to enable the fluidized beds in each furnace section to maintain substantially the same height.

Toward the fulfillment of these and other objects, according to the system and method of the present invention a furnace is provided which is divided into at least two sections by a common wall. A fluidized bed is formed in each section and the flue gases from each bed entrain the bed particles and rise upwardly in each section before discharging to a cyclone separator or the like. Both the upper section and the lower section of the common wall are vented in order to equalize its gas pressure across the wall in the upper portion of the furnace and maintain identical bed heights in the lower portion of the furnace.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawing wherein.

DESCRIPTION OF THE PREFERRED EMBODIMENT

Figure 2:
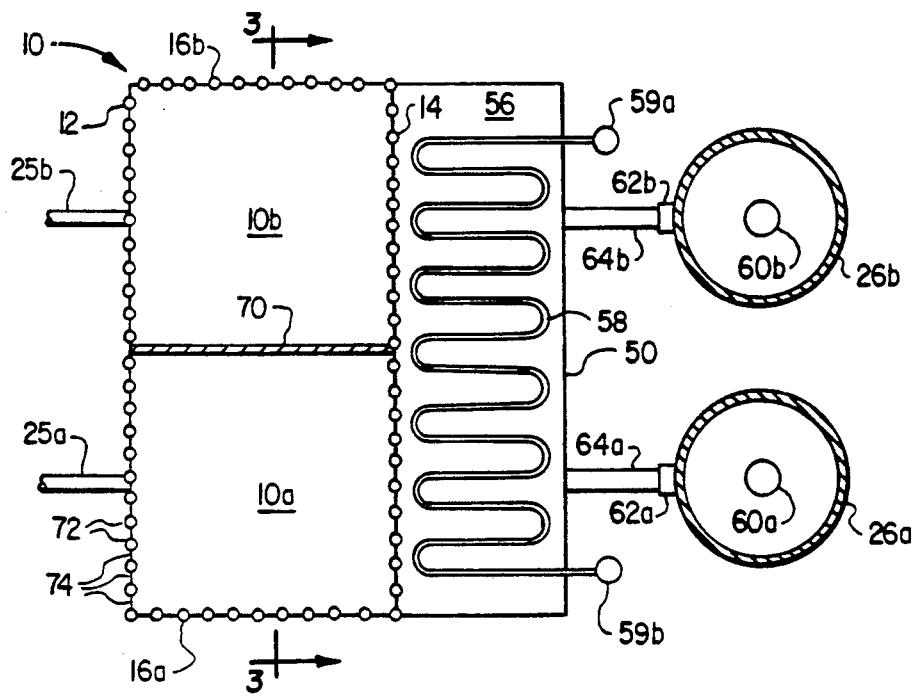
FIG. 2 is an enlarged cross-sectional view taken along the line 2—2 of FIG. 1.

The drawings depicts the fluidized bed combustion system of the present invention used for the generation of steam. The system includes an upright water-cooled furnace, referred to in general by the reference numeral 10, having a front wall 12, a rear wall 14 and two sidewalls 16a and 16b (FIG. 2). The upper portion of the furnace 10 is enclosed by a roof 18 and the lower portion includes a floor 20.

A perforated plate, or grate, 22 extends across the lower portion of the furnace 10 and extends parallel to the floor 20 to define an air plenum 24 which is adapted to receive air from an external source (not shown) and selectively distribute the air through the perforations in the plate 22, as will be described.

Two feeder systems, 25a (FIG. 1) and 25b (shown partially in FIG. 2) are provided adjacent the front wall 12 for introducing particulate fuel material into the furnace 10. Adsorbent, such as limestone, in particle form can also be introduced into the furnace 10 by a ducts connected to the feeder systems 25a and 25b respectively, or by a separate feeder system. The particulate fuel and adsorbent material are fluidized by the air from the plenum 24 as it passes upwardly through the plate 22. This air promotes the combustion of the fuel which generates combustion gases, and the resulting mixture of the combustion gases and the air (hereinafter collectively termed "flue gases") rises in the furnace 10 by convection and entrains a portion of the particulate material as will be described.

Two cyclone separators 26a and 26b (FIG. 2) extend adjacent the furnace 10. A duct 28 extends from an outlet opening 14a provided in the rear wall 14 of the furnace 10 to an inlet opening provided through the wall of the separator 26a. It is understood that another duct (not shown) connects the rear wall 14 to the separator 26b.

The separators 26a and 26b receive the flue gases and the entrained particle material from the furnace 10 in a manner to be described and operate in a conventional manner to disengage the particulate material from the flue gases due to the centrifugal forces created in the separators. The separated flue gases in the separator 26a, which are substantially free of solids, pass, via a duct 30 located immediately above the separator 26a, into a heat recovery section 32, via an inlet 32a provided through a wall thereof. It is understood that the separated flue gases from the separator 26b also pass, via another duct (not shown), into the heat recovery section 32.

The heat recovery section 32 includes an enclosure 34 divided by a vertical partition 36 into a first passage which houses a reheater 38, and a second passage which houses a primary superheater 40. An economizer is provided and has an upper section 42a located in the above-mentioned second passage and a lower section 42b in the lower portion of the heat recovery section 32. An opening 36a is provided in the upper portion of the partition 36 to permit a portion of the gases to flow into the passage containing the superheater 40 and the economizer sections 42a and 42b. The reheater 38, the superheater 40 and the economizer sections 42a and 42b are all formed by a plurality of heat exchange tubes extending in the path of the gases as they pass through the enclosure 34. After passing across the reheater 38, the superheater 40 and the economizer sections 42a and 42b in the two parallel passes, the gases exit the enclosure 34 through an outlet 34a.

Figure 1:
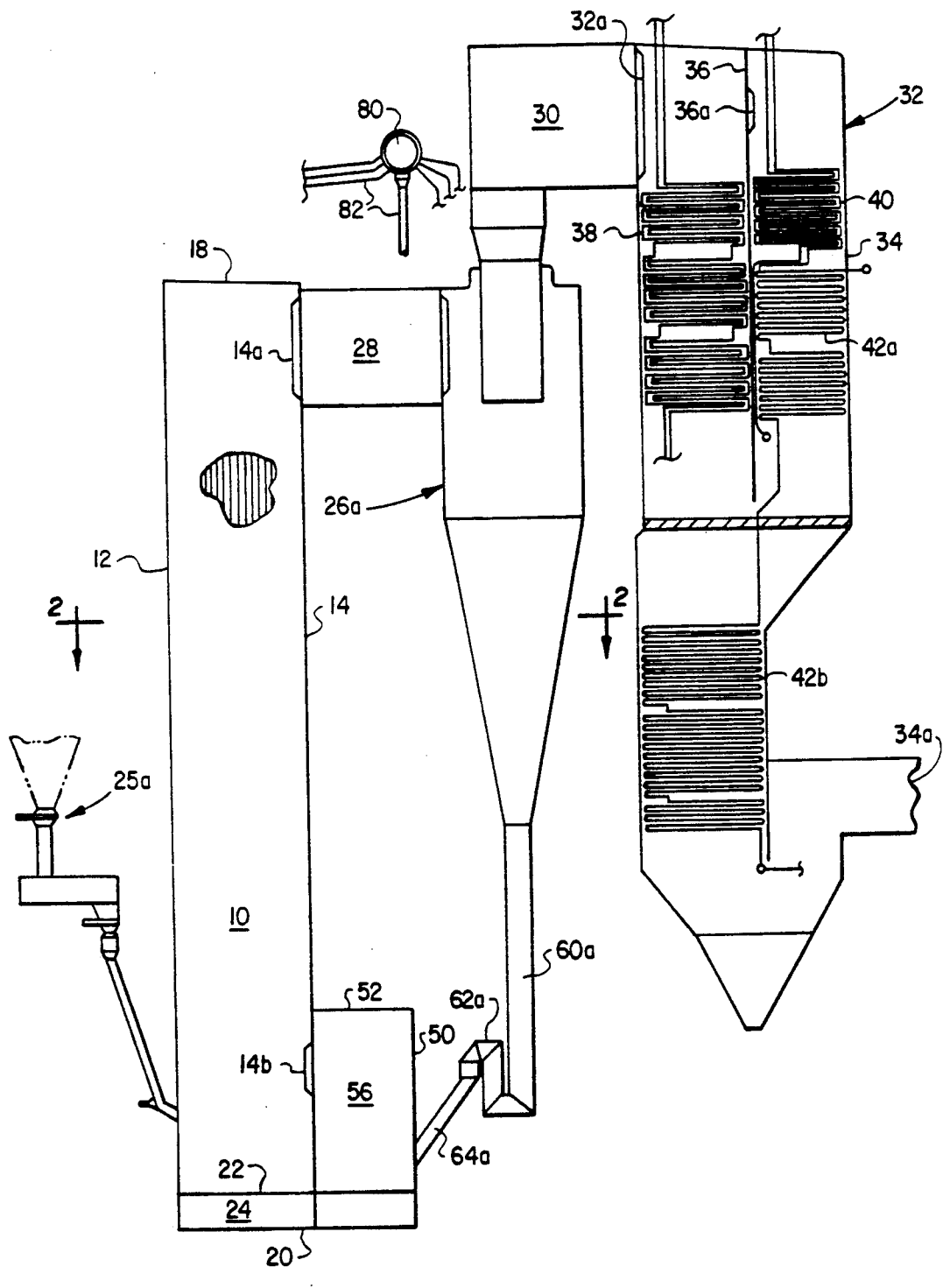
FIG. 1 is a schematic representation depicting the system of the present invention.

As shown in FIG. 1, the floor 20 and the plate 22 extend past the rear wall 14, and a vertically-extending partition 50 extends upwardly from the floor 20 and parallel to the rear wall 14. A roof 52 extends from partition 50 to the rear wall 14 and, as shown in FIG. 2, the lower portions of the sidewalls 16a and 16b are also extended past the rear wall 14 to complete an enclosure which defines a recycle heat exchange section 56. The heat exchange section 56 communicates with the furnace section through openings 14b formed through the lower portion of the rear wall 14, for reasons to be described. A bank of heat exchange tubes 58 are disposed in the heat exchange section 56 and extend between an inlet feeder 59a and an outlet feeder 59b. The plennum 24 extends underneath the heat exchange section 56 for introducing air to the latter section in a manner to be described.

The lower portion of the separator 26a is conically shaped and is connected to a dip leg 60a which, in turn, is connected to a J-valve 62a. An inlet conduit 64a connects the outlet of the J-valve 62a to the heat exchange section 56 to transfer the separated solids from the separator 26a to the latter section. The J-valve 62a functions in a conventional manner to prevent backflow of solids from the furnace section 54 and the heat exchange section 56 to the separator 26a. As shown in FIG. 2, a dip leg 60b, a J-valve 62b and an inlet conduit 64b are all associated with the separator 26b and are identical to the dip leg 60a, the J-valve 62a and the conduit 64a associated with the separator 26a.

Figure 3:
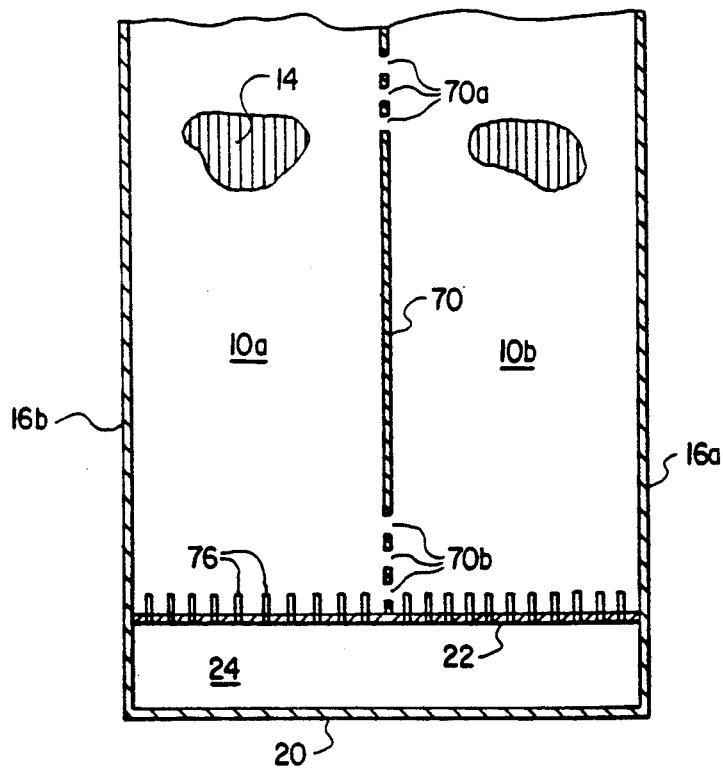
FIG. 3 is a cross-sectional view taken along the line 3—3 of FIG. 2.

As shown in FIGS. 2 and 3, a partition 70 is provided in the furnace 10 and extends between the walls 12 and 14 and parallel to, and midway between, the sidewalls 16a and 16b for the height of the furnace to divide the furnace into two sections 10a and 10b. A plurality of openings 70a are provided in the upper portion of the partition 70 and a plurality of openings 70b are provided in the lower portion of the partition 70, for reasons to be described.

It is understood that extending from the outlet opening 14a in the upper portion of the rear wall 14 is the duct 28 for connecting the furnace section 10a to the separator 26a and that a similar duct (not shown) extends between and connects the furnace section 10b to the separator 26b.

As better shown in FIG. 2 the front wall 12, the rear wall 14, the sidewalls 16a and 16b, as well as the walls defining the heat recovery enclosure 34 all are formed by a plurality of spaced tubes 72 having continuous fins 74 extending from diametrically opposed portions thereof to form a gas-tight membrane in a conventional manner.

As shown in FIG. 3, a plurality of rows of air distributors, or nozzles, 76 extend through the perforations in the plate 22 in the furnace sections 10a and 10b for distributing air from the plenum 24 upwardly into the furnace sections 10a and 10b. It is understood that a plurality of similar nozzles (not shown) extend through the perforations in the plate 22 in the heat exchange section 56. The outlet conduit of the feeder systems 25a and 26b extend through openings in the front wall 12 and into the furnace section 10a and 10b, respectively.

It is understood that drain pipes, or the like, may be associated with the plate 22 as needed for discharging the particulate material from the furnace sections 10a and 10b and the heat exchange section 56 as needed.

A steam drum 80 (FIG. 1) is located above the enclosure 10 and, although not shown in the drawings, it is understood that a plurality of headers are disposed at the ends of the various water-tube walls described above. As shown in general by the reference numeral 82, a plurality of downcomers, pipes, etc. are utilized to establish a steam and water flow circuit through these headers, the steam drum 80, the tubes forming the aforementioned water tube walls, and the tubes 58 in the heat exchange section 56, with connecting feeders, risers, headers being provided as necessary. The boundary walls of the cyclone separators 26a and 26b and the tubes forming the reheater 38 and the superheater 40 are thus steam cooled while the economizer portions 42a and 42b receive feed water and discharge it to the steam drum 80. Thus, water is passed, in a predetermined sequence through this flow circuitry, including the downcomers and pipes 82, to convert the water to steam and heat the steam by the heat generated by combustion of the particulate fuel material in the furnace 10.

In operation, particulate fuel material and particulate sorbent material are introduced into the furnace sections 10a and 10b through the feeder systems 25a and 25b, respectively. Alternately, sorbent may also be introduced independently through openings formed through one or more of the furnace walls 12, 14, 16a and 16b. Air from an external source is introduced at a sufficient pressure into that portion of the plenum 24 extending below the furnace sections 10a and 10b, and the air passes through the nozzles 76 at a sufficient quantity and velocity to fluidize the solids in the latter sections.

A lightoff burner (not shown), or the like, is provided to ignite the fuel material, and thereafter the fuel material is self-combusted by the heat in the furnace sections 10a and 10b. A homogeneous mixture of the fuel particles and the adsorbent particules, in various stages of combustion and reaction, is thus formed in the furnace sections 10a and 10b, which mixture is hereinafter referred to as "particulate material". The openings 70b in the partition 70 are sized to permit adequate flow of the particulate material between the furnace sections 10a and 10b so that the respective heights of the solids in each section are substantially the same.

The flue gases pass upwardly through the furnace sections 10a and 10b and entrain, or elutriate, a portion of the particulate material. The quantity of particulate material introduced into the furnace sections 10a and 10b and the quantity of air introduced, via the air plenum 24, through the nozzles 76 and into the interior of the furnace sections is established in accordance with the size of the particulate material so that a dense bed is formed in the lower portions of the furnace sections 10a and 10b and a circulating fluidized bed is formed in the upper portions thereof, i.e. the particulate material is fluidized to an extent that substantial entrainment or elutriation thereof is achieved.

Thus the density of the particulate material is relatively high in the lower portion of the furnace sections 10a and 10b, decreases with height throughout the length of the furnace sections and is substantially constant and relatively low in the upper portions of the furnace sections.

The flue gases passing into the upper portion of the furnace sections 10a and 10b are substantially saturated with the particulate material and pass, via the outlet openings in the upper portion of the rear wall 14, into the cyclone separators 26a and 26b. The openings 70b in the upper portion of the partition 70 equalize the gas pressure in each furnace section 10a and 10b and thus eliminate any pressure drop across the partition 70.

In the separators 26a and 26b, the particulate material is separated from the flue gases and the former passes from the separators 26a and 26b into the heat exchange section 56 as described above. The cleaned flue gases from the separators 26a and 26b pass to the heat recovery section 32 for passage through the enclosure 34 and across the reheater 38, the superheater 40, and the economizer sections 42a and 42b, before exiting through the outlet 34a to external equipment.

With reference to FIGS. 2 and 3, the separated particulate material from each of the separators 26a and 26b enters the heat exchange section 56 and builds up on that portion of the plate 22 in the latter section Assuming normal operation, fluidizing air is introduced, via the plenum 24, to the nozzles 76 in the heat exchange section 56 to fluidize the particulate material therein. The particulate material gives up heat to the water/steam in the tubes 58 in the heat exchange section 56 before passing through the openings 14b in the lower portion of the wall 14 and back to the furnace sections 54a and 54b.

Feedwater is introduced to and circulated through the flow circuit described above including the water wall tubes, the tubes 58 in the heat exchange section 56 and the steam drum 80, in a predetermined sequence to convert the feed water to steam and to reheat and superheat the steam. To this end, the heat removed from the solids by the tubes 58 in the heat exchange section 56 can be used to provide reheat and/or full or partial superheat.

It is understood that the heat exchange section 56 can be provided with a bypass compartment, or compartment that does not contain any heat exchange tubes, so that, during initial start up and low load conditions the solids can be routed through this bypass compartment and directly back to the furnace 10 without encountering any tubes. In this manner, start up and low load operation can be achieved without exposing the banks of tubes 58 to the hot recirculating solids. This technique is fully disclosed in U.S. pending patent application Ser. No. 537,397 filed Jun. 12, 1990 and assigned to the assignee of the present invention, the disclosure of which is incorporated by reference.

The system and method of the present invention have several advantages. For example, the use of two adjacent furnace sections 10a and 10b defined by the partition 70 enables the size of the furnace 10, and therefore the load capacity, to be increased without increasing the height of the furnace. Moreover, the provision of openings provided in the lower portion of the partition 70 equalizes the height of the respective beds in the furnace sections 10a and 10b, thus correcting for imbalances in the fuel feed from the feeder systems 25a and 25b, or the like. Further, since the adjacent furnace sections 10a and 10b are the same, a single control scheme can be utilized which operates both sections. Moreover, the provision of the openings 70a and the upper portion of partition 70 enables the respective gas pressures in the furnace sections 10a and 10b to be equalized, thus minimizing or eliminating any lateral loading across the partition 70 and possible damage. Also, the openings 70a enable a predetermined gas pressure drop to be set across the furnace 10 and enables the entrainment and circulation to be identical in each furnace section 10a and 10b. Also, the provision of the openings 70a enables identical combustion environments to be established above the dense bed in both furnace sections 10a and 10b.

Although the preferred embodiment described above utilizes a single partition 70 to divide the furnace section into two identical furnace sections 10a and 10b, it is understood that multiple partitions can be used in a similar manner to divide the enclosure into multiple sections. As examples of this, FIGS. 4 and 5 depict alternate embodiments of the present invention which include structure identical to that of the embodiment of FIGS. 2 and 3 which structure is referred to by the same reference numerals.

Figure 4:
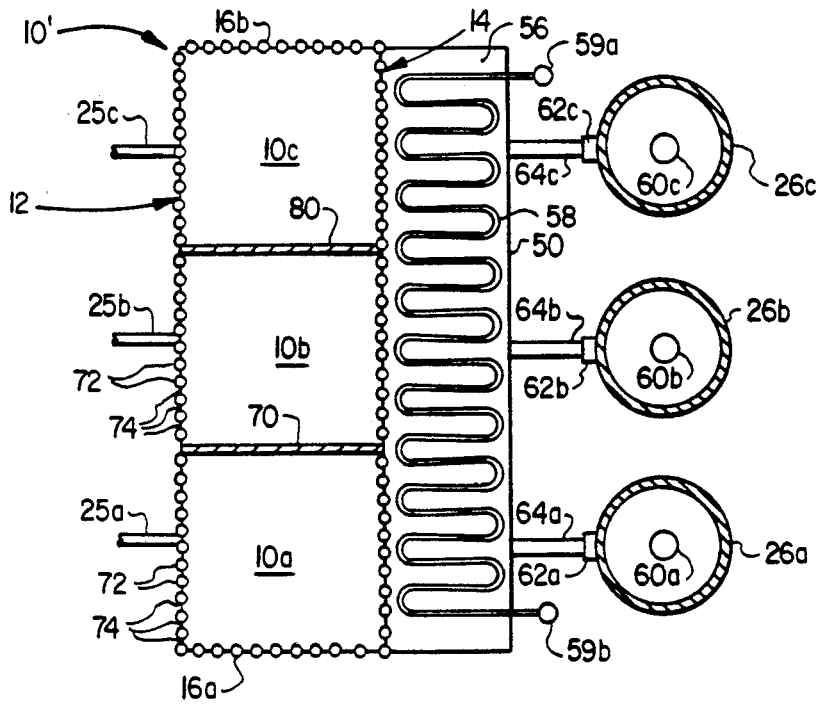
FIGS. 4 and 5 are views similar to FIG. 2 but depicting alternate embodiments of the system of the present invention.

According to the embodiment of FIG. 4 the widths of the walls 12, 14 and 50 are increased and a partition 84 is provided in the furnace 10 which extends from the wall 12 to the wall 14, and which is disposed between, and parallel to, the partition 70 and the sidewall 16b to define another furnace section 10c. A feeder system 25c (shown partially in FIG. 4) is added for supplying coal and sorbent into the furnace section 10c. Also, another separator 26c is added, along with a dip leg 60c, a J-valve 62c and an inlet conduit 64c which is connected to the heat exchange section 56 and is in alignment with the furnace section 10c. The partition 84 has openings (not shown) provided in its upper portion and its lower portion similar to the openings 70a and 70b of the partition 70, and the embodiment of FIG. 4 functions in the same manner as described above in connection with the embodiment of FIGS. 1-3 while enjoying the added capacity and flexibility of the additional furnace section 10c.

Figure 5:
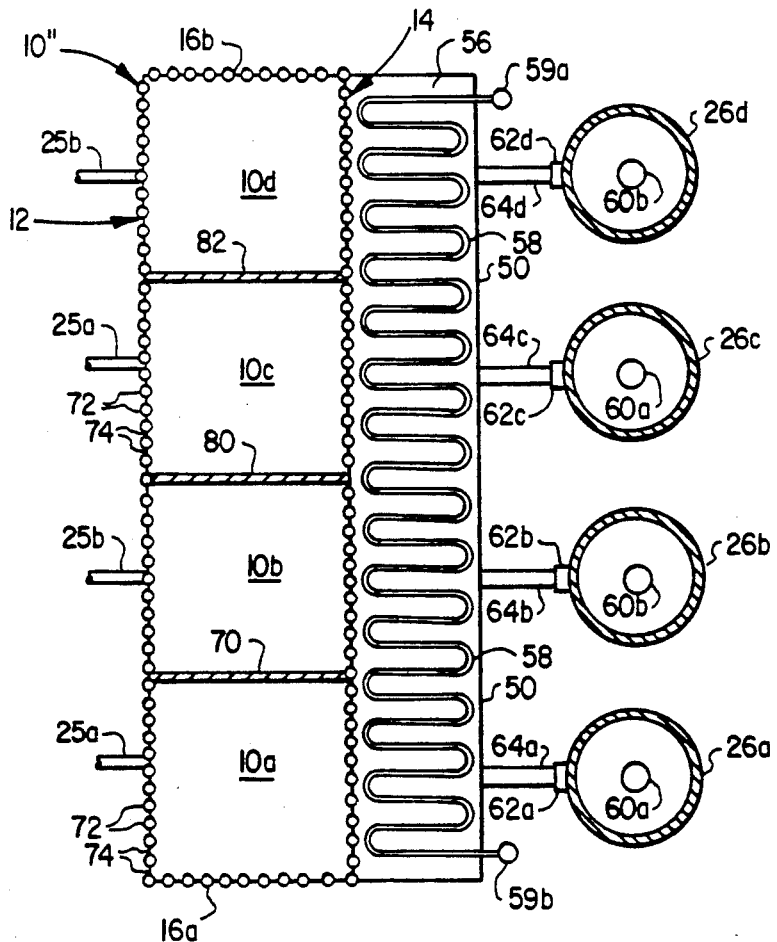

According to the embodiment of FIG. 5 the widths of the walls 12, 14 and 50 are increased even more and another partition 86 is provided in the furnace 10 which extends from the wall 12 to the wall 14 and which is disposed between, and parallel to, the partition 84 and the sidewall 16b to define another furnace section 10d. A feeder system 25d (shown partially in FIG. 5) is added for supplying coal and sorbent into the furnace section 10d. Also, another separator 26d is added, along with a dip leg 60d, a J-valve 62d and an inlet conduit 64d which is connected to the heat exchange section 56 and is in alignment with the furnace section 10d. The partition 86 has openings (not shown) provided in its upper portion and its lower portion similar to the openings 70a and 70b of the partition 70. The embodiment of FIG. 5 functions in the same manner as described above in connection with the embodiment of FIGS. 1-3 and the embodiment of FIG. 4 and enjoys the added capacity and flexibility of the additional furnace section 10d.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fluidized bed combustion system comprising an enclosure, partition means disposed in said enclosure and dividing said enclosure into a plurality of sections, means for introducing particulate material including fuel to said enclosure, grate means disposed in each of said sections for supporting said particulate material, means for introducing air through said grate means and into said particulate material for fluidizing said particulate material to form a relatively dense region of said particulate material in the lower portion of each of said sections, a region of decreasing density in the middle portion of each of said sections and a substantially constant and low density region in the upper portion of each of said sections, at least one opening extending through the lower portion of said partition means adjacent said dense regions for permitting said particulate material to flow between said sections to equalize the height of said particulate material in said sections and at least one opening extending through the upper portion of said partition means adjacent said low density regions for equalizing the pressure between said sections.

2. The system of claim 1 further comprising separating means disposed adjacent said enclosure for receiving a mixture of flue gases and entrained particulate material from said sections and for separating said particulate material from said gases.

3. The system of claim 2 further comprising heat exchange means for receiving said separated particulate material from said separating means.

4. The system of claim 3 further comprising means for permitting said separated particulate material to pass from said heat exchange means back to said enclosure.

5. The system of claim 4 wherein said heat exchange means comprises a housing disposed adjacent to, and sharing a common wall with, said enclosure, said passage means comprising an opening extending through said common wall.

6. The system of claim 1 wherein said heat exchange means further comprises a plurality of tubes disposed in said housing for passing a fluid in a heat exchange relation to the separated particulate material in said housing to heat said fluid and control the temperature of the separated particulate material.

7. The system of claim 1 wherein said air introducing means comprises an air plenum extending below said grate means for receiving fluidizing air, and a plurality of nozzles supported by said grate mean for receiving said air from plenum and introducing said air into said sections.

8. The system of claim 1 wherein said partition means comprises one partition disposed in said enclosure and dividing said enclosure into two sections.

9. The system of claim 1 wherein said partition means comprises two partitions disposed in said enclosure and dividing said enclosure into three sections.

10. The system of claim 1 wherein said partition means comprises three partitions disposed in said enclosure and dividing said enclosure into four sections.

11. A method of operating a fluidized bed combustion system comprising the steps of dividing an enclosure into a plurality of sections, introducing particulate material including fuel to said sections, supporting said particulate material in said sections, introducing air into said sections and into said particulate material for fluidizing said particulate material to form a relatively dense region of said particulate material in the lower portion of each of said sections, a region of decreasing density in the middle portion of each of said sections and a substantially constant and low density region in the upper portion of each of said sections, combusting said fuel to generate combustion gases in said sections, equalizing the heights of said dense regions of said particulate material in said sections and equalizing the combustion gas pressure between said sections.

12. The method of claim 11 wherein said step of equalizing comprises the step of permitting said particulate material to flow between said sections.

13. The method of claim 11 wherein said air and said combustion gases mix in said furnace sections and entrain particulate material in said sections.

14. The method of claim 13 further comprising the steps of passing said mixture of air, gases and entrained particulate material from said sections and separating said particulate material from said mixture of air and gases, passing said separated mixture of air and gases to a heat recovery section and passing said separated particulate material to a heat exchanger.

15. The method of claim 14 further comprising the step of removing heat from said separated particulate material in said heat exchanger.

16. The method of claim 14 further comprising the step of passing said separated particulate material from said heat exchanger back to said enclosure.

17. A fluidized bed combustion system comprising an enclosure, partition means disposed in said enclosure and dividing said enclosure into a plurality of sections, means for introducing particulate material including fuel to said enclosure, grate means disposed in each of said sections for supporting said particulate material, means for introducing air through said grate means and into said particulate material for fluidizing said particulate material, at least one opening extending through the lower portion of said partition means for permitting said particulate material to flow between said sections to equalize the height of said particulate material in said sections, separating means disposed adjacent said enclosure for receiving a mixture of flue gases and entrained particulate material from said sections and for separating said entrained particulate material from said gases, heat exchange means extending between said separating means and said enclosure for receiving said separated particulate material from said separating means and for removing heat from said separated particulate material, and means for passing said separated particulate material back to said enclosure.

18. The system of claim 17 further comprising at least one opening extending through the upper portion of said partition means or equalizing the pressure between said sections.

19. The system of claim 17 wherein said heat exchange means comprises a housing disposed adjacent to, and sharing a common wall with, said enclosure, said passing means comprising an opening extending through said common wall.

20. The system of claim 19 wherein said heat exchange means further comprises a plurality of tubes disposed in said housing for passing a fluid in a heat exchange relation to said separated particulate material in said housing to heat said fluid and control the temperature of said separated particulate material.

21. The system of claim 17 wherein said air introducing means comprises an air plenum extending below said grate means for receiving fluidizing air, and a plurality of nozzles supported by said grate means for receiving said air from plenum and introducing said air into said sections.

22. The system of claim 17 wherein said separating means comprises a plurality of separators, and wherein said partition means comprises at least one partition disposed in said enclosure and dividing said enclosure into a plurality of sections corresponding in number to said separators.

23. The system of claim 19 wherein said separating means comprises a plurality of separators, and wherein said partition means comprises at least one partition disposed in said enclosure and dividing said enclosure into a plurality of sections corresponding in number to said separators.

24. The system of claim 23 wherein a single housing extends between said plurality of separators and said plurality of enclosure sections.

* * * * *